United States Patent [19]

Blakeslee

[11] 4,301,571
[45] Nov. 24, 1981

[54] APPARATUS AND METHOD FOR EXTRACTING BELLIES FROM CLAM MEAT

[76] Inventor: Gerald A. Blakeslee, 117 Morris Ave., Milton, Del. 19968

[21] Appl. No.: 157,197

[22] Filed: Jun. 6, 1980

Related U.S. Application Data

[63] Continuation-in-part of Ser. No. 59,742, Jul. 23, 1979, Pat. No. 4,249,283.

[51] Int. Cl.³ .............................................. A22C 29/04
[52] U.S. Cl. .......................................... 17/51; 17/53
[58] Field of Search ................... 17/53, 74, 51, 58, 71

[56] References Cited

U.S. PATENT DOCUMENTS

| | | | |
|---|---|---|---|
| 2,808,612 | 10/1957 | Snow | 17/53 |
| 3,421,620 | 1/1969 | Lapeyre | 17/53 X |
| 3,688,344 | 9/1972 | Carlson | 17/53 |
| 3,722,035 | 3/1973 | Hanks | 17/51 X |
| 3,789,457 | 2/1974 | Snow | 17/53 X |
| 3,890,676 | 6/1975 | Snow | 17/53 X |
| 3,964,131 | 6/1976 | Snow | 17/53 |
| 4,148,112 | 4/1979 | Marvin | 17/53 |

Primary Examiner—Willie G. Abercrombie
Attorney, Agent, or Firm—B. P. Fishburne, Jr.

[57] ABSTRACT

Shucked whole clams are propelled by suction through a tube having multiple alternating bulbous portions and constrictions. In passing through this tube, each clam is subjected to a repetitive pulsating squeezing or massage action which results in separation or substantial loosening of the belly from the clam meat or tongue. At the outlet end of this delivery tube, each clam is forced through an abrupt elbow and in so doing the clam tongue bends around the acute angular side of the elbow and nearly reverses its direction of travel. This near reversal momentarily reduces the speed of travel of the clam tongue, and at this moment the tongue is subjected to substantial vacuum near the outlet of the elbow by a pair of oblique angular fluid nozzles whose axes cross one above the other to direct their streams toward the opposite side walls of a horizontal product discharge pipe. In such pipe, the nozzle fluid streams exert a spinning action on the product assuring final and complete separation of the bellies from the usable clam meat.

9 Claims, 6 Drawing Figures

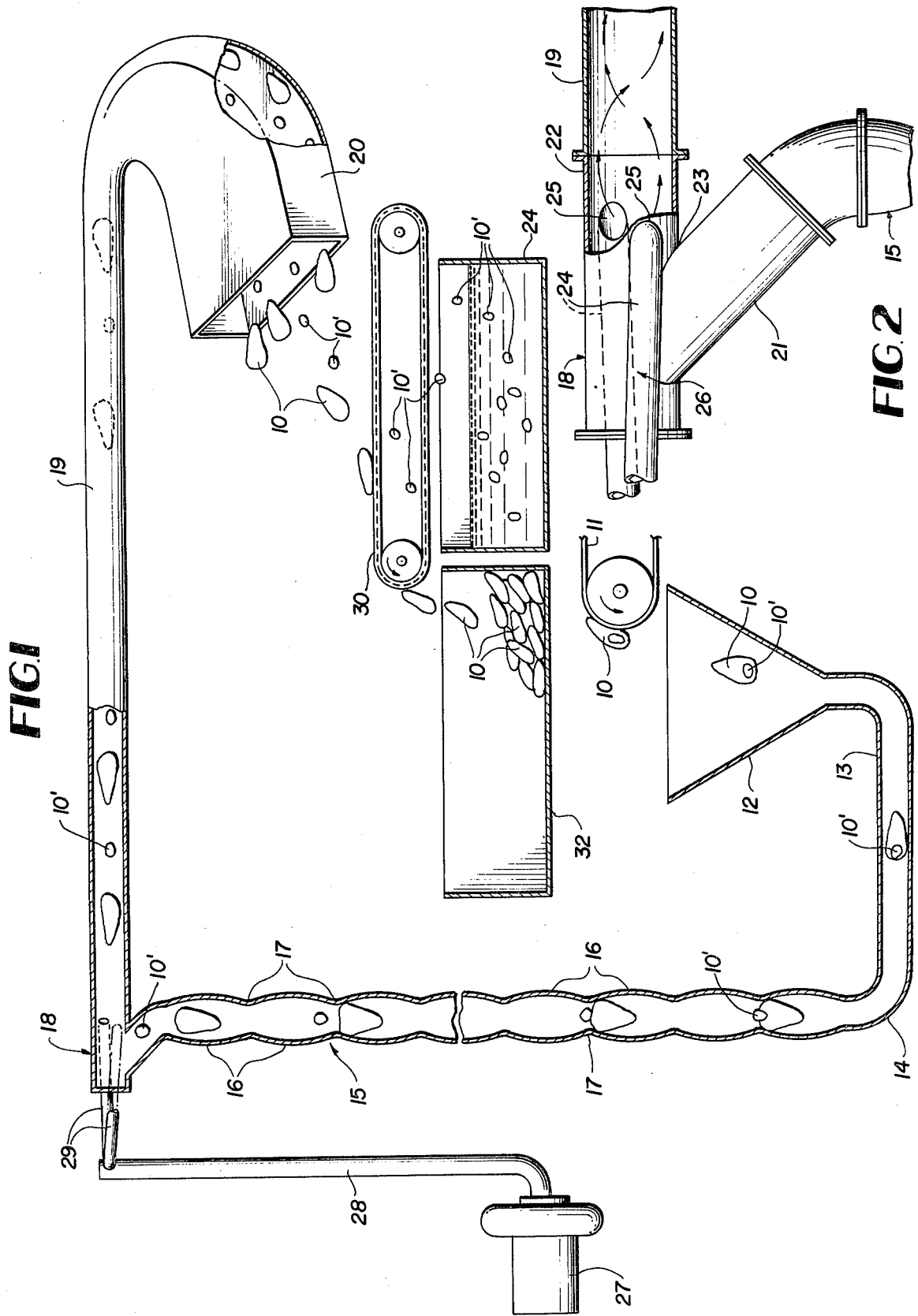

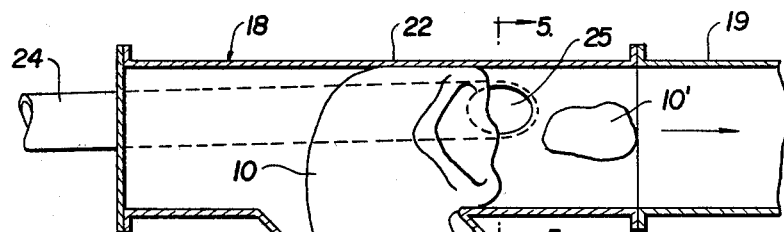
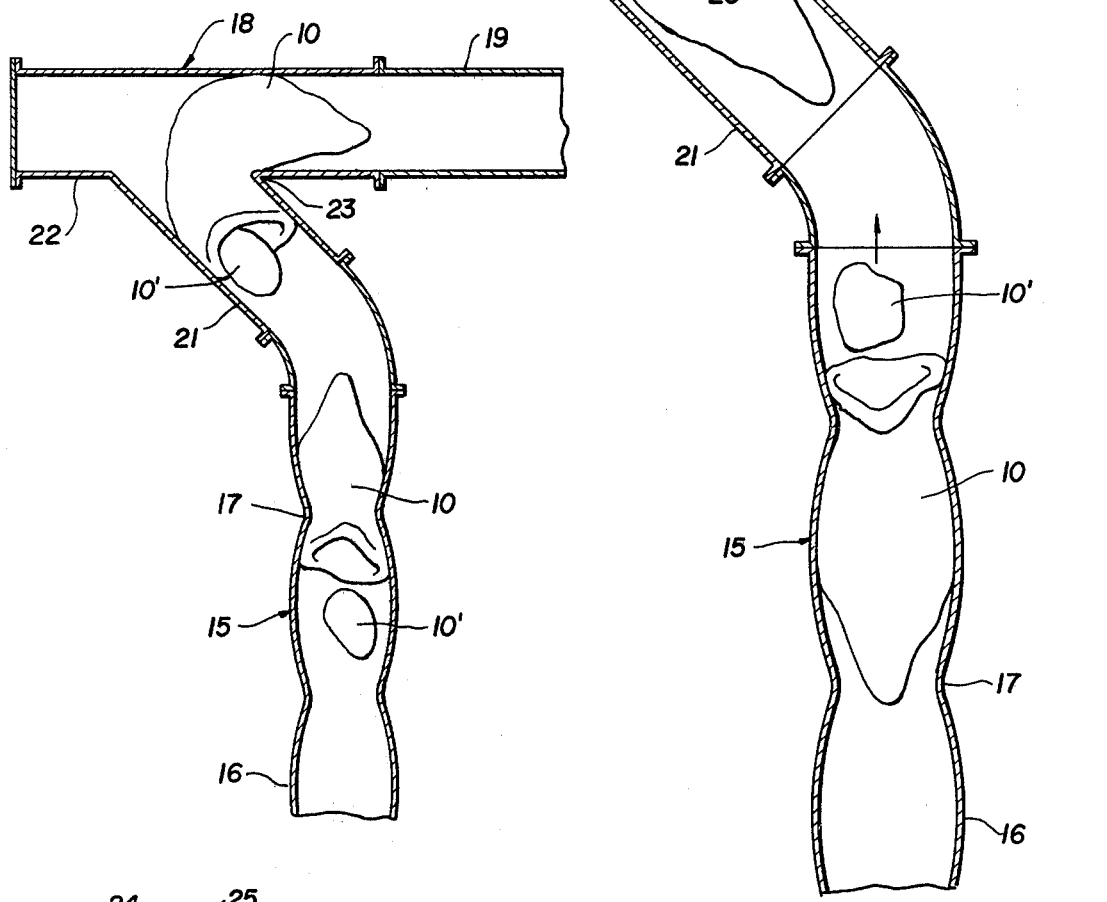
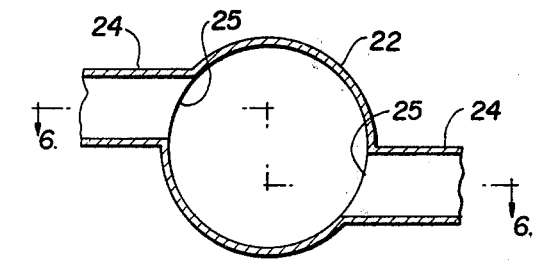
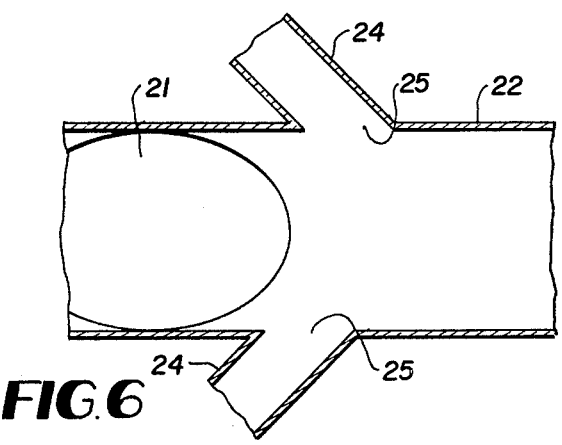

APPARATUS AND METHOD FOR EXTRACTING BELLIES FROM CLAM MEAT

CROSS-REFERENCE TO RELATED APPLICATION

This application is a continuation-in-part of prior copending application Ser. No. 06/059,742, filed July 23, 1979, now U.S. Pat. No. 4,249,283 issued Feb. 10, 1981 for METHOD AND APPARATUS FOR EXTRACTING CLAM BELLIES.

BACKGROUND OF THE INVENTION

The present invention relates to improvements in the apparatus and method set forth in the above prior application rendering the same even more efficient in the complete separation of bellies from the clam tongue or usable meat by a gentle and progressive process which does not mangle or otherwise damage the tongue.

As discussed in the prior application, the present invention seeks to avoid the damage to the delicate clam tongues inherent in the impact belly extraction system of the Carlson U.S. Pat. No. 3,688,344 and the similar damage caused by the high velocity fluid shearing evisceration process of the Marvin U.S. Pat. No. 4,148,112.

The present invention continues to utilize the rising product delivery tube having multiple bulbous enlargements and intervening constrictions through which the clams are propelled by suction developed near the top of this tube or conduit. While being forced through this delivery tube, each clam is subjected repetitively to a pulsating squeezing action at the constrictions followed by a sudden release into the bulbous enlargement beyond each constriction. In effect, the clams while being massaged or squeezed repeatedly are also decelerated and accelerated repeatedly when entering and passing beyond each constriction as fully developed in the prior application to gradually separate the bellies from the clam tongues prior to exiting from the top of the delivery tube.

The present invention includes the addition to the upper discharge end of the delivery tube of an acute angular elbow coupled between the delivery tube and the horizontal product discharge pipe leading to a decelerator and finally to a separating system for the bellies and undamaged clam tongues. The elbow contains a pair of oblique angular crossing fluid nozzles which create suction in the discharge branch of the elbow and develop a spinning action on the product in the horizontal discharge pipe. In passing through the abrupt elbow, each clam tongue is literally bent around the acute angular wall at the inner side of the elbow to further massage it. During such bending and massaging, the clam tongue substantially reverses its direction of travel and therefore has its velocity drastically reduced at the point of entry into the horizontal discharge branch of the elbow aligned with the horizontal product discharge pipe. At the moment of minimum velocity, each clam tongue is subjected to the full vacuum generated by the two crossing fluid nozzles in the elbow and any belly which might still be connected to a tongue is pulled by suction from the momentarily held-up tongue in the abrupt elbow.

In summation, the present invention assures gentle, complete and clean separation of the belly from practically every clam tongue in a continuous process by first subjecting the product to the repetitive squeezing massage action in the bulbous constricted delivery tube according to the prior application, followed by the abrupt bending massage action and abrupt deceleration in the elbow with simultaneous application of strong suction at or near the elbow outlet and the generation of a spinning stream in the horizontal discharge pipe leading from the elbow to decelerator and separator means.

BRIEF DESCRIPTION OF THE DRAWINGS

FIG. 1 is a partly schematic side elevation of apparatus used in the method of extracting bellies from clam tongues in accordance with the invention.

FIG. 2 is an enlarged fragmentary side elevation of a product bending, decelerating and direction reversal elbow and associated fluid nozzles.

FIGS. 3 and 4 are similar views depicting passage of clam tongues through the belly separating apparatus in a belly cavity leading and belly trailing mode, respectively.

FIG. 5 is a vertical section taken on line 5—5 of FIG. 3.

FIG. 6 is a horizontal section taken on line 6—6 of FIG. 5.

DETAILED DESCRIPTION

Referring to the drawings in detail wherein like numerals designate like parts, shucked whole clams 10 or other marine mollusks are delivered from a conveyor 11 to an intake hopper 12 having an outlet pipe 13 connected by an elbow 14 to a rising elongated delivery tube 15 having multiple coaxial equally sized and spaced bulbous portions 16 and intervening constrictions 17 also having equal diameters.

Preferably, the internal diameter of each bulbous portion 16 at its point of maximum cross section is about two inches while the diameter os each constriction 17 is about one and one-half inches. These dimensions may be varied depending upon the particular type of mollusk undergoing processing, such as surf clams or quahog clams. These latter type clams, being somewhat smaller, require the bulbous portions 16 to be about one and one-half inch in internal diameter while the constriction 17 is about one inch in internal diameter.

As will be further described, the clams are propelled through the rising delivery tube 15 by suction developed at the top of this tube and each clam is subjected to a squeezing massage action at each constriction 17 and a simultaneous slowing down in movement at the constriction followed by a sudden release into the next uppermost bulbous enlargement 16, as described in the prior application. Each squeezing action, deceleration and sudden release with acceleration in the tube 15, coupled with the action of constant suction, causes the clam bellies 10' to be progressively loosened from the clam bodies or tongues while passing through the tube 15 so that at the top of this tube all of the bellies 10' are either fully extracted or substantially extracted from the tongues, attached thereto by mere threads of tissue if not completely separated.

At the top or outlet end of delivery tube 15, FIG. 2, an abrupt angular elbow 18 is coupled between the delivery tube 15 and a horizontal product discharge pipe 19 leading to a reversely curved decelerator 20 of gradually increasing cross section. The elbow 18 has an inclined inlet branch 21 opening into a horizontal outlet branch 22. An acute angle 23 is formed by the intersection of these elbow branches around the sharp apex of which each clam tongue or body 10 must pass with a bending action as depicted in FIGS. 3 and 4 of the drawings. This bending action retards the movement of each clam tongue in the elbow and subjects it to a further strong massaging immediately prior to the entry of the tongue into the horizontal discharge pipe 19.

Within the horizontal branch 22 of elbow 18 are a pair of obliquely angled crossing axis fluid nozzles 24 whose delivery tips 25 are slightly downstream from the apex 23. Also, the tip 25 of the lower fluid nozzle 24 is slightly rearwardly of the tip 25 of the upper nozzle. The axes of the two nozzles 24 are directed in crossed relationship, one above the other, toward the opposite side walls of horizontal elbow branch 22 and pipe 19 and the axis of each nozzle forms an acute angle with the axis of the other nozzle and with the axis of elbow branch 22. The nozzle streams of fluid may or may not come into contact with each other before reaching the opposite side walls of the horizontal conduit. The two crossing nozzle streams promote a spinning action in the fluid and in the product entrained therein in the horizontal discharge pipe 19.

Additionally, the action of the fluid nozzles 24 creates and maintains a constant suction in the delivery tube 15 to lift the product therethrough and a maximum suction zone 26 is created substantially at the top of elbow branch 21 where the axis of this branch crosses the axis of the branch 22. Thus, a strong additional suction is exerted on each clam tongue while it is being abruptly bent around the elbow angle or apex 23. The final strong massage action, abrupt deceleration and subjection to suction in the elbow 18 will dislodge and completely separate any bellies which might still be clinging to any clam tongues at this stage of the process. Finally, the spinning action of the product stream in the discharge pipe 19 would tend to separate even the last few bellies 10' which might escape separation in the rising tube 15 and elbow 18.

Concerning the elbow 18, it should be understood that the clam tongues while passing through the elbow make a turn of approximately 135 degrees, thereby substantially changing or reversing their direction of travel. This near reversal drastically slows down the speed of movement of the tongues at the turn of the elbow and it is at this point of minimum velocity that the tongues are subjected to the action of vacuum produced by the two nozzle streams in the elbow. Such action will complete the extraction of bellies which might still be attached partially to clam tongues. It may be seen that the structure of the elbow 18 with its crossing nozzles 24 complements and adds to the belly separating action of the delivery tube 15 in the prior application and renders the overall system even more effective.

The two nozzles 24 are supplied with water from a pump 27 through a pipe 28 having two branches 29, as shown in FIG. 1.

When the separated bellies 10' and tongues 10 exit from the decelerator 20, they pass onto a separating conveyor 30 from which the smaller bellies enter an underlying collection tank 31 while the clam tongues are delivered to a separate collection tank 32 at the end of the conveyor 30.

Preferably, water delivered by the pump 27 is at a pressure of about 65 psi resulting in a fluid velocity at the outlets of nozzles 24 of about 5000–6000 feet per minute. This velocity is far too slow to cut or mangle the clam meat but sufficient to maintain a vacuum in the zone 26 of the elbow of about 27 inches of mercury. The system assures clean separation of the bellies from the tongues without mangling the meat either by the shearing action of fluid streams or by impacting the meat against a fixed screen or the like. The belly separation process is gentle, progressive and complete in accordance with the present invention. It closely resembles the action of separating the bellies from clams by hand with a squeezing massage action. However, the invention process is rapid and economical whereas the hand operation is far too slow to be commercially practical. By means of the invention, 2500 pounds per hour of shucked whole clams can be cleanly debellied without damaging the delicate clam meat of the tongue.

FIGS. 3 and 4 of the drawings illustrate, respectively, that clams may pass through the system with belly cavity leading or trailing in relation to the clam tongue 10, and in either case the massaging action of delivery tube 15 and the described bending and movement retarding action of the elbow 18 is effective in separating the bellies 10' from the tongues in the manner previously described.

In passing through the delivery tube 15, the clam tongues 10 may or may not substantially fill the cross section of the delivery tube. Clam size may vary and the squeezing massage action of the tube 15 is effective in all cases. Larger clams may pass through the constrictions 17 single file fashion while smaller clams may pass through two or more at a time.

While the invention has been described in relation to clams in particular, it should be understood that the process is fully applicable to all types of marine mollusks.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A method of extracting bellies from marine mollusks comprising utilizing suction to propel marine mollusks through a delivery tube in one direction, causing the mollusks to abruptly change and partially reverse their direction of travel beyond one end of the delivery tube and thereby abruptly bending the mollusks, subjecting them to a strong massage action and retarding their speed of travel, and acting on the mollusks with suction while their speed of travel is at the lowest point to complete extraction of the bellies from the mollusks.

2. The method of claim 1, and said changing and partial reversing of the direction of travel of the mollusks comprising causing the mollusks to pass through an abrupt angular elbow whose branches converge at an acute angle.

3. The method of claim 1, and said changing and partial reversing of direction of travel of the mollusks comprising causing the mollusks first to turn in one direction at an angle to the axis of the delivery tube and then to turn in a generally reverse direction through an angle of about 135 degrees to the axis of said one direction.

4. A method of extracting the bellies of marine mollusks comprising subjecting the mollusks to a repetitive squeezing massage action along a path of travel of the mollusks to loosen and separate the bellies thereof, forcing the mollusks to change their direction of travel abruptly following said squeezing massage action and thereby substantially retarding the speed of travel of said mollusks, and acting on the mollusks with suction during the time when their speed of travel is at a minimum to complete the separation of any bellies which remain attached to the mollusks.

5. The method of claim 1, and producing said suction in a zone immediately following said change and partial reversing of said direction of travel by the action of a pair of crossing closely adjacent pressurized fluid streams directed downstream of said delivery tube and zone in a manner to induce spinning of the mollusks and separated bellies in a discharge conduit leading away from said zone.

6. The method of claim 4, and utilizing a pair of cross axis divergent pressurized fluid streams to generate said suction.

7. An apparatus for extracting bellies from marine mollusks comprising a delivery tube through which the mollusks are conveyed from a source, an acute angular elbow coupled with the discharge end of the delivery tube through which the mollusks are forced to travel with an abrupt bending massage action and a speed of travel retarding action, and means to generate a pair of closely adjacent crossing fluid pressure streams in the outlet branch of said elbow immediately beyond the bend of the elbow, said streams being directed toward opposite side walls of said outlet branch at acute angles thereto, said streams generating a steady degree of suction in the delivery tube and elbow.

8. An apparatus for extracting bellies from marine mollusks as defined in claim 7, and said means comprising a pair of crossing nozzles in the outlet branch of said elbow with the discharge tip of one nozzle disposed below and somewhat rearwardly of the tip of the other nozzle, the elbow lying substantially in a vertical plane with said delivery tube.

9. An apparatus for extracting bellies from marine mollusks as defined in claim 8, and the elbow having an inlet branch acutely angled to the outlet branch and obliquely angled away from the axis of said delivery tube, the outlet branch of said elbow being substantially horizontal.

* * * * *